Oct. 28, 1969 H. G. STRATMAN 3,475,694

AUTOMATIC FREQUENCY CONTROL

Filed March 8, 1967 3 Sheets-Sheet 1

INVENTOR.

Hardin G. Stratman

BY Hill, Sherman, Meroni, Gross & Simpson ATTORNEYS

Oct. 28, 1969 H. G. STRATMAN 3,475,694

AUTOMATIC FREQUENCY CONTROL

Filed March 8, 1967 3 Sheets-Sheet 2

INVENTOR.

Hardin G. Stratman

BY Hill, Sherman, Meroni, Gross & Simpson ATTORNEYS

Oct. 28, 1969 H. G. STRATMAN 3,475,694

AUTOMATIC FREQUENCY CONTROL

Filed March 8, 1967 3 Sheets-Sheet 3

INVENTOR.

Hardin G. Stratman

BY Hill, Sherman, Meroni, Gross & Simpson ATTORNEYS

United States Patent Office 3,475,694
Patented Oct. 28, 1969

3,475,694
AUTOMATIC FREQUENCY CONTROL
Hardin G. Stratman, Quincy, Ill., assignor to Gates Radio Company, Quincy, Ill., a corporation of Illinois
Filed Mar. 8, 1967, Ser. No. 621,628
Int. Cl. H03b 3/04
U.S. Cl. 331—8 9 Claims

ABSTRACT OF THE DISCLOSURE

An automatic frequency control system having means for developing a low frequency signal indicative of the frequency level of an RF amplifier, including means for squaring the low frequency signal, limiting the amplitude of that signal as well as the duration thereof and having means for converting the amplitude and duration limited signal into a D-C signal which is then compared with a reference signal to develop an error signal which is indicative of the deviation of the frequency of the signal being controlled. The means for limiting the amplitude and the duration of the low frequency signal includes means for dividing the low frequency signal into first and second signal components and for time delaying one of the components, for inverting the polarity of the time delayed component and for recombining the two components to produce a resulting signal which then has a D-C value which is indicative of the frequency of the signal.

SUMMARY

One of the principal features of the present invention is the provision of a novel means for developing an error signal which is indicative of the frequency deviation of a signal being controlled from a specified frequency level.

Another feature of the present invention is the provision of an automatic frequency control system having an improved means for developing a uniform pulse train having a D-C or average value which is indicative of the frequency of the signal being controlled.

Another feature of the present invention is the provision of a means for converting an A-C frequency variable pulse train to a D-C signal which is indicative of the frequency variation of the pulse train.

It is an object of the present invention to provide an automatic frequency control system having means to develop a monitor signal indicative of the frequency of the signal being controlled wherein the monitor signal is divided into first and second signal components, and wherein the second signal component is time delayed, inverted and recombined with the first signal component to develop a uniform pulse train wherein the duration of each pulse is precisely limited by the time delay of the second signal component.

It is another object of this invention to provide an automatic frequency control system of the type described above wherein the time delay of the second signal component is precisely controlled by the use of a temperature compensating thermistor connected in parallel with the input of the second signal component amplifier.

It is an additional object of this invention to provide an automatic frequency control system which establishes a low frequency uniform pulse train wherein the average or D-C value of the pulse train is utilized in combination with a variable reference signal to develop a specified output at a control device when the frequency of the uniform pulse train attains a pre-chosen level and to develop an error signal when the frequency of the uniform pulse train deviates either above or below the pre-chosen frequency level.

It is another object of this invention to provide a frequency variable pulse train at the input of a control transistor and to apply a reference signal at the output of the transistor such that a given input frequency causes the voltage at one of the terminals of the transistor to adopt a zero reference level and wherein all other frequencies at the input of the transistor develop a voltage at the transistor terminal which is indicative of the frequency deviation of the input frequency from the given frequency level.

BRIEF DESCRIPION OF THE DRAWINGS

DESCRIPTION OF THE PREFERRED EMBODIMENT

Figure 1:
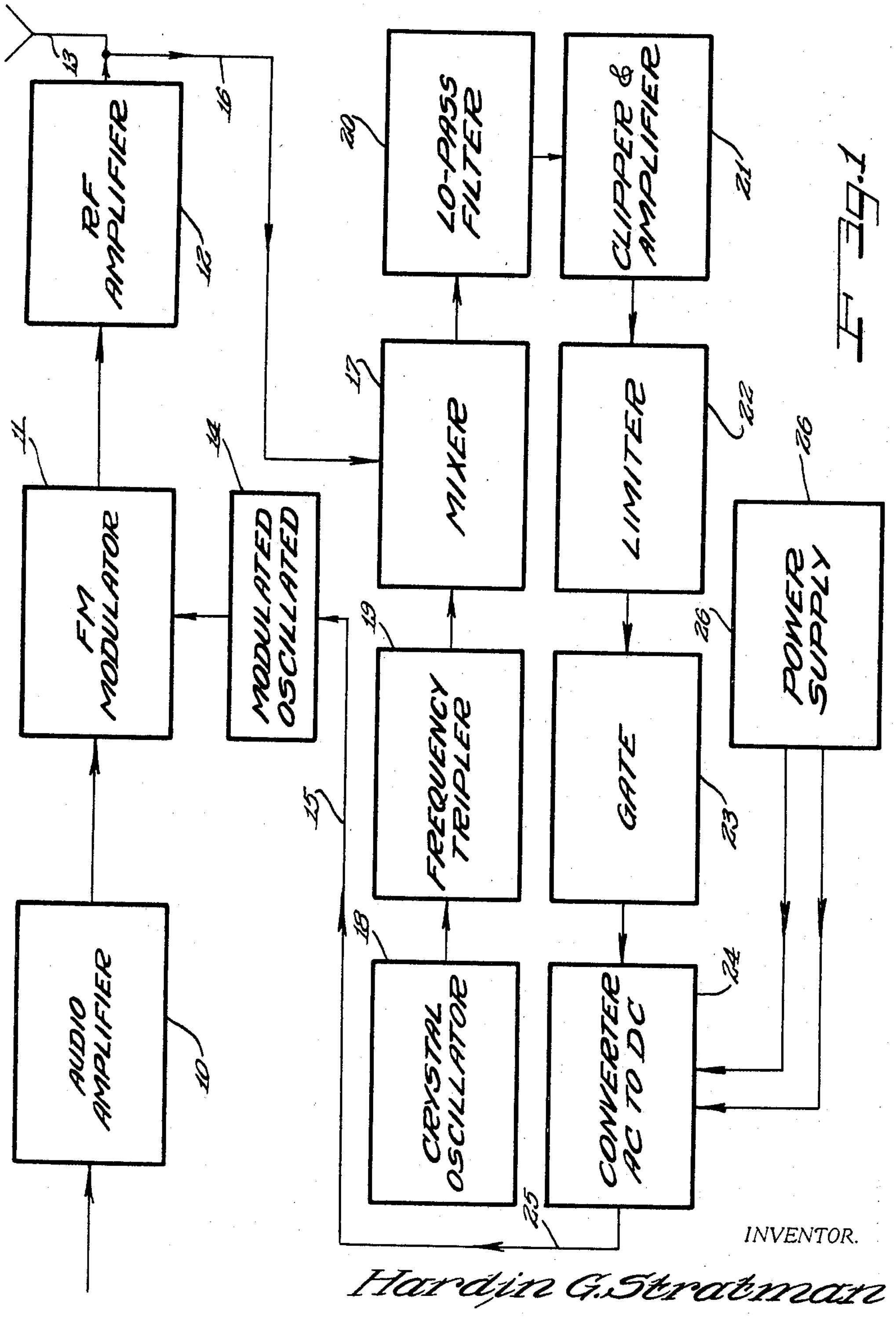
FIGURE 1 is a block diagram of an automatic frequency control system embodying the features of the present invention.

The block diagram of FIGURE 1 shows an audio amplifier 10 which leads to an FM modulator 11 and to an RF amplifier 12 which in turn is connected directly to an antenna 13. The FM modulator is supplied with a frequency source 14 which is variable in accordance with a voltage signal applied through a line 15 to the frequency source 14.

It is important that the frequency at the output of the RF amplifier be maintained at a substantially constant frequency level. For this purpose, an automatic frequency control system is provided which consists of the remainder of the blocks illustrated in the block diagram of FIGURE 1.

In particular, the frequency at the output of the RF amplifier is sampled through a line 16 and fed to a mixer circuit 17. A second frequency is fed to the mixer from a crystal oscillator 18 which is a carefully controlled frequency standard. The frequency output of the oscillator 18 is coupled to a frequency tripler 19, and the output of the tripler 19 is fed to the mixer 17.

For example, the frequency from the RF amplifier 12 which is fed to the mixer 17 may be in the order of 108 megacycles, and the frequency fed to the mixer 17 from the frequency tripler 19 may be in the order of 107.8 megacycles. As is well understood, in the mixer 17, sum and difference frequency signals are generated, with the difference signal, in the stated case, being 200 kilocycles. A low pass filter 20 allows only the difference signal or the 200 kilocycle signal to pass to a clipper and amplifier stage 21.

The clipper and amplifier stage 21 in combination with a limiter 22 may be said to be squaring circuits or circuits to shape the substantially sinusoidal signal at the output of the low pass filter 20 into a substantially square waveform at the output of the limiter 22.

The output of the limiter 22 is fed to a gate circuit 23 which fixes both the amplitude and the duration of the incoming signal to a high degree of accuracy such that at the output of the gate, the D-C or average value of the pulse train is directly proportional to the frequency of the pulse signal. The pulse train as developed in the gate circuit 23 is then fed to a converter 24 where the D-C value of the gate circuit is utilized in combination with a reference signal to develop an error signal at the point 25 which is indicative of the deviation of the incoming gated signal from a given frequency level.

For example, if the desired RF amplifier signal is 108 megacycles and the output of the frequency tripler 19 is 107.8 megacycles, then the output of the converter at 25 must be zero when the gated pulse train at the input of the converter is equal to 200 kilocycles. To establish a zero error signal at the point 25 when the input to the converter is 200 kilocycles, a reference signal is varied within the converter circuit. By providing that the reference signal will generate a zero output when the input to the converter is 200 kilocycles, an error signal is produced when the input frequency to the converter deviates from the desired 200 kilocycles. This error signal is then applied to the modulated oscillator as a D-C voltage level and accordingly adjusts the output frequency of the modulated oscillator which in turn adjusts the frequency at the output of the RF amplifier until the RF frequency is returned to the 108 megacycles which is precisely required to establish a 200 kilocycle input to the converter 24 and hence a zero error output from the converter. The reference signal within the converter as well as the power to the entire circuit may be taken from a power supply 26 which is illustrated generally in FIGURE 1.

Figure 2:
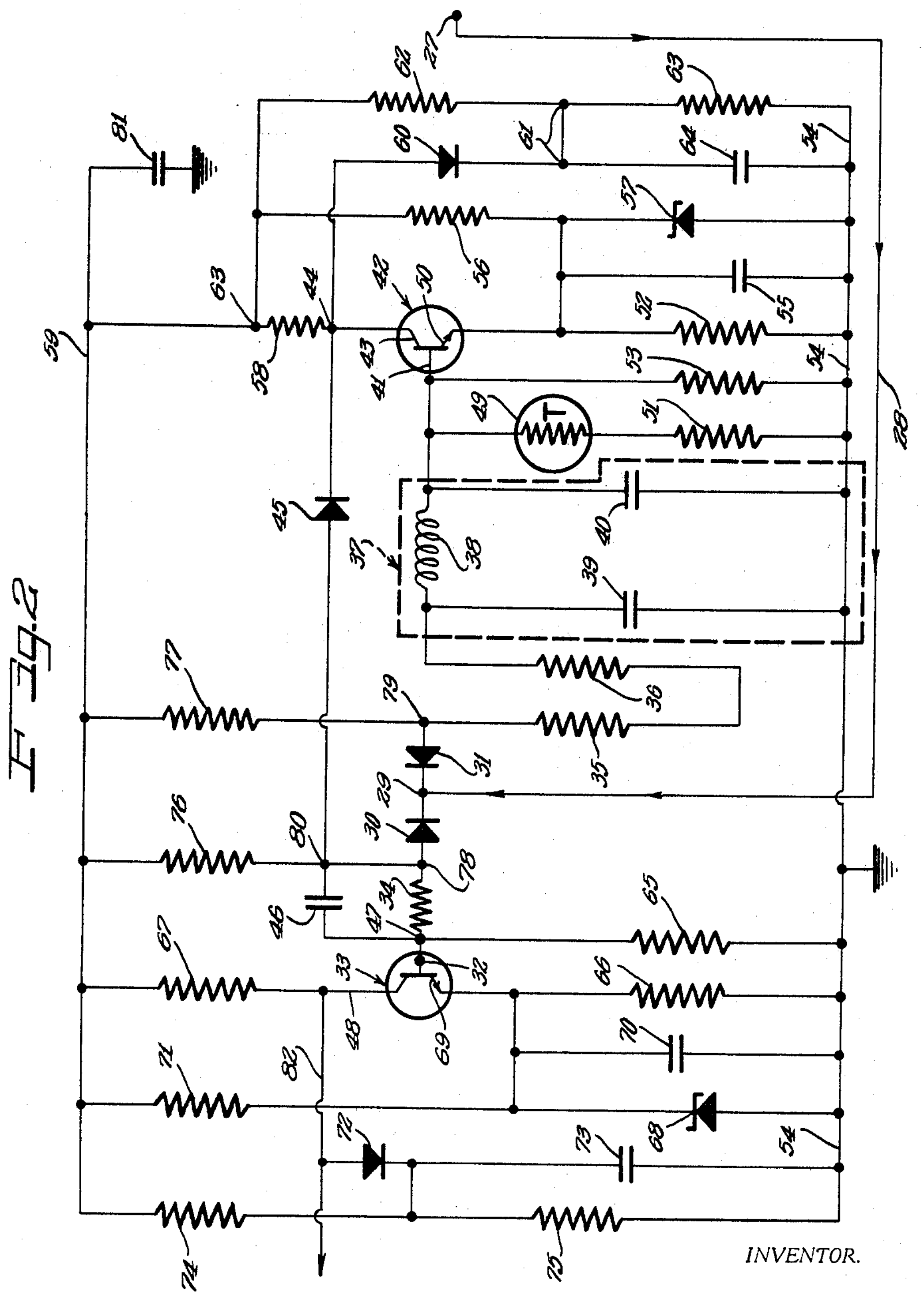
FIGURE 2 is a portion of a schematic which illustrates in detail the circuit elements included in the gate circuit of the block diagram of FIGURE 1.

The gate circuit which is illustrated schematically in FIGURE 2 has an input 27 which receives the squared difference frequency signal originating in the mixer 17. The signal from the input 27 is fed through a line 28 to a circuit junction point 29.

The incoming signal is then divided into first and second signal components by the diodes 30 and 31, respectively. The first signal component is then applied to the base 32 of a transistor 33 through a resistor 34. The second signal component is applied through first and second resistors 35 and 36 to a time delay network 37.

The time delay network 37 comprises an inductor 38 and first and second capacitors 39 and 40. The output of the time delay network is connected directly to the base 41 of a second transistor 42.

As soon as either the first or the second signal component is applied to the base of the respective transistors 33 and 42, the transistor will be turned "on." This means that the transistor 33 will be turned "on" substantially immediately, while the transistor 42 will be turned "on" only after the time delay caused by the delay circuit 37. However, when the capacitor 40 reaches a suitable charge, the transistor 42 will be turned "on" thereby generating a negative pulse at the collector 43 thereof. The negative pulse generated at the collector 43 will then be applied to a circuit junction point 44 and through a diode 45 and capacitor 46 to the base 32 of the transistor 33 through a circuit junction point 47.

Since the presence of a pulse at the junction point 29 generates a positive pulse at the base of the transistor 33, the turning "on" of the transistor 42 will generate a negative pulse at the base 32 of the transistor 33. This means that the time delayed pulse will be opposed to the first signal component and will subtract therefrom to turn "off" the transistor 33.

The effect is to provide a turn "on" time for the transistor 33 which is precisely controlled by the delay circuit 37. Accordingly, the output of the transistor 33 as measured at the collector 48 thereof is a pulse train with each pulse having a precisely controlled and uniform pulse duration.

To assure that the transistor 42 is turned "on" after the same time interval under all conditions, a thermistor 49 is connected in parallel with the input of the transistor 42 and in particular is connected between the base 41 of the transistor 42 and the emitter 50 of the transistor through biasing resistors 51 and 52.

If for instance, the temperature ambient of transistor 42 should decline, the resistance of the thermistor 49 increases, and the forward bias on the transistor 42 accordingly increases thereby compensating for the decreased sensitivity of the transistor due to the declined ambient temperature. It will be noted that a further resistor 53 is connected from the base 41 of the transistor 42 to the circuit ground 54. Similarly, each of the resistors 51 and 52 are connected to the circuit ground line 54. Accordingly, all of the resistors 49, 51, 52 and 53 in combination affect the bias level of the transistor 42.

A capacitor 55 is connected from the emitter 50 of the transistor 42 to the ground line 54 of the circuit and this capacitor aids in maintaining the square appearance of the pulse train. The capacitor 55 assures a fast rise and fall time for the pulse waveform.

A number of resistors establish the operating point for the transistor 42. In particular, the resistors 52 and 53 establish the voltage levels at the base 41 and the emitter 50 of the transistor 42. Also, a diode 57 which is connected from the emitter 50 to the ground line 54 establishes the operating voltage for the emitter 50 of the transistor 52. Also, a resistor 58 is connected from the collector 43 to the voltage supply source at a circuit line 59 and establishes the voltage operating level of the collector 43. The voltage level at the collector 43 and across the resistor 58 is determined by a resistor 56 which is connected from the circuit supply line 59 to the cathode of the diode 57 and directly to the emitter 50 of the transistor 42.

The amplitude of the pulse train developed at the collector 43 of the transistor 42 is precisely limited through the provision for a diode 60 which is connected from the circuit junction point 44 at the collector 43 to a circuit junction point 61. A resistor 62 is connected from the circuit junction point 63 at the voltage power supply line 59 to the cathode of the diode 60 at the circuit junction point 61. A further resistor 63 is connected from the circuit junction point 61 to the ground line 54 as shown. Accordingly, the resistors 62 and 63 establish the bias level for the diode 60, and accordingly, when the magnitude of the pulse train appearing at the collector 43 of the transistor 42 exceeds the bias level of the diode 60, the diode 60 becomes conductive, thereby shorting the pulse train from the collector 43 through a capacitor 64 to the circuit ground line 54.

In a similar manner, resistors 65, 66, 67 and diode 68 establish the operating points for the transistor 33. The resistor 67 establishes the operating point for the collector 48, the resistor 65 establishes the bias level for the base 32 of the transistor 33, and the resistor 66 in combination with the diode 68 establishes the voltage level for the emitter 69 of the transistor 33. Also, a capacitor 70, similar to the capacitor 55, aids in maintaining the square configuration of the input pulse train to the transistor 33. Similar to the resistor 56, a resistor 71 is connected from the supply line 59 to the cathode of the diode 68 and establishes the bias level normally applied to the diode 68.

As in the case of the diode 60, a diode 72 is connected from the collector 48 of the transistor 33 to a capacitor 73 and through the capacitor 73 to the circuit ground line 54. The diode 72 in conjunction with the capacitor 73 and resistors 74 and 75 determines the precise level at which the collector 48 is limited. Accordingly, the output pulses of the collector 48 are clipped at a specified level as well as at a specified time duration to establish a uniform pulse train wherein the D-C or average value of the train is indicative of the number of pulses occuring in a unit of time or which is indicative of the frequency of the output signal of the transistor 33.

Further resistors 76 and 77 are connected from the voltage supply line 59 to junction points 78 and 79 at the anodes of the diodes 30 and 31 to establish the operating levels thereof and to assure that a positive pulse is developed at the output of the diodes in response to the application of a pulse to the circuit junction point 29. The resistor 76 is also connected to a circuit junction point 80 at the capacitor 46. The connection of the capacitor 46 between the circuit junction point 80 and the base terminal 32 of the transistor 33 assists in speeding up the application of the leading edge of the pulse train from the collector 43 of the transistor 42 to the base 32 of the transistor 33. Also, a capacitor 81 is connected from the supply line 59 to ground and provides an A-C bypass for the circuit.

Figure 3:
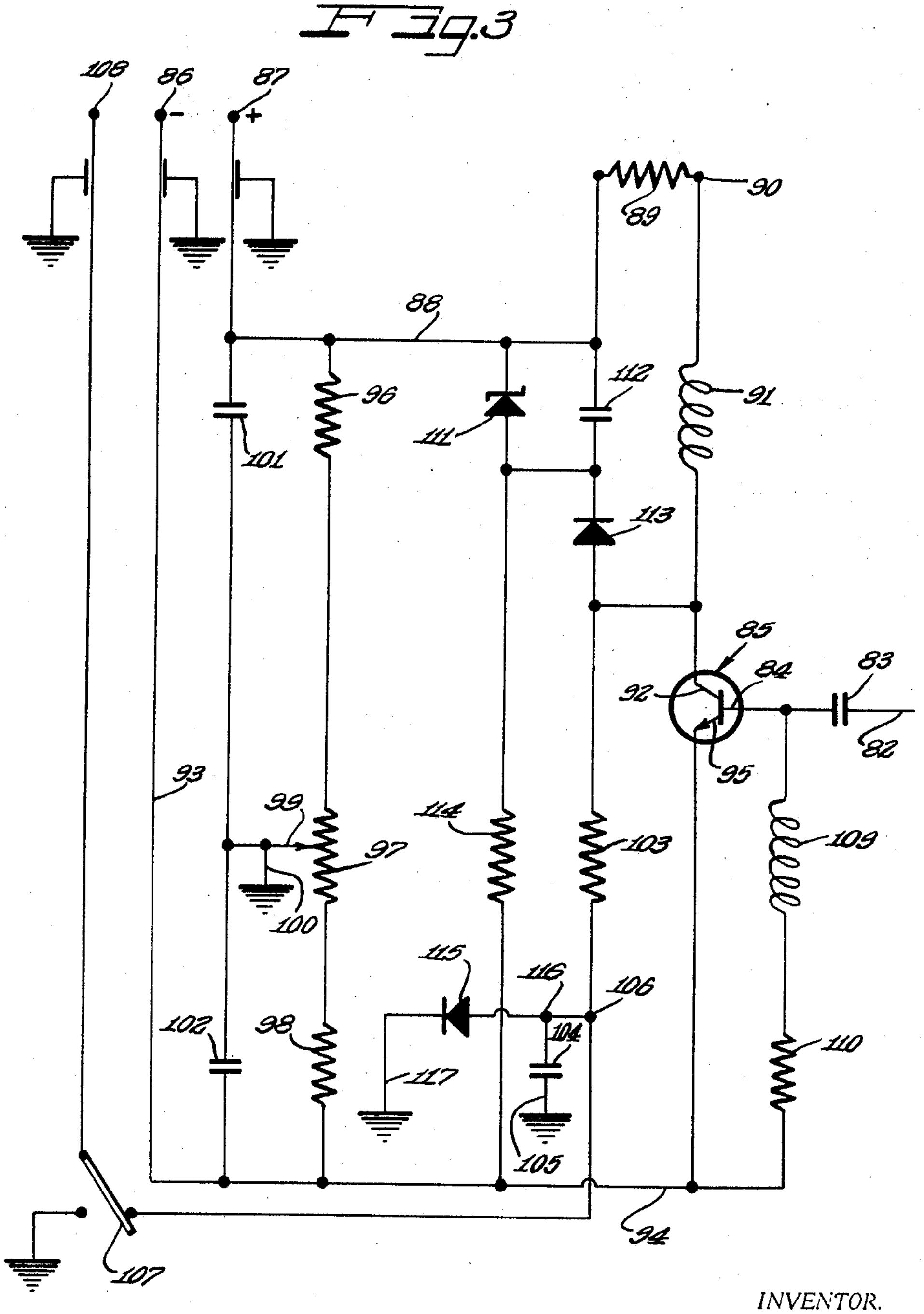
FIGURE 3 is a continuation of the schematic diagram of FIGURE 2 and specifically illustrates the circuit features embodied in the converter block of the block diagram of FIGURE 1.

The output of the gate circuit 23 is applied from the collector 48 of the transistor 33 through a line 82 as shown in FIGURE 2 and FIGURE 3 to a capacitor 83. The capacitor 83 is a coupling capacitor between the gate network and the converter 24.

The fixed amplitude and fixed duration pulse train is applied to a base 84 of a comparison means or transistor 85.

A reference supply signal is applied across terminals 86 and 87 such that the positive side thereof is applied through a line 88 and a resistor 89 to a junction point 90 and through an inductor 91 to the collector 92 of the transistor 85. The negative terminal of the voltage supply is connected through a line 93 to a circuit common line 94 and to the emitter 95 of the transistor 85. Accordingly, the voltage supply is applied across the output terminals or collector-to-emitter of the transistor 85.

However, the voltage supply does not have a ground connection to the circuit, as shown in FIGURE 3, and accordingly, means are provided to establish a circuit reference ground which will determine the voltage level relative to the circuit ground. In particular, resistors 96, 97 and 98 are connected in series from the positive side of the voltage supply source at the line 88 to the negative side thereof at the line 94. The resistor 97 is variable with a pointer 99 being connected to the circuit ground at the point 100. By varying the pointer 99, the voltage above circuit ground on the line 88 and below circuit line of the line 94 may be varied. The pointer 99 is connected between two smoothing capacitors 101 and 102.

When a pulse appears at the base terminal 84 of the transistor 85, the transistor 85 is placed in a conducting state due to the polarity of the supply reference source as applied across the collector and emitter terminals thereof. As will be understood, the higher the frequency of the signal applied to the base 84 of the transistor 85, the lower will be the voltage appearing at the collector 92. This is because the transistor will be conducting for a greater portion of the time, and the average voltage drop across the transistor will decrease. Now, if the pointer 99 is set at such a level as to establish a voltage at the collector 92 of the transistor 85 such that when the frequency at the base 84 is exactly 200 kilocycles, the voltage at the collector 92 is zero, a null point will be achieved which reflects deviation in the frequency at the base 84 about the chosen frequency of 200 kilocycles. This means, that if the frequency at the base 84 is either above or below 200 kilocycles, the voltage at the collector 92 will either be above or below zero.

The voltage appearing at the collector 92 of the transistor 84 is sensed through a connection from the collector 92 through a resistor 103 and a capacitor 104 to circuit ground at a point 105. The detection line is connected to a junction point 106 between the resistor 103 and the capacitor 104 and extends through a cutout switch 107 to a terminal 108. The terminal 108 is connected to the line 25 of FIGURE 1 and to the modulated oscillator 14 as shown thereon. The cutout switch 107 is simply to remove the automatic frequency control from the network and to allow the modulated oscillator to be free running if desired.

The inductor 91 as well as an inductor 109 and a capacitor 110 which are connected from the base circuit line 84 to the circuit common line 94 assist in shaping the squarewave signal which is developed at the output of the transistor and assures that the output signal corresponds to the duration of the input squarewave pulse train. Also, a diode 111 in combination with a capacitor 112 and a diode 113 assures that the magnitude of the squarewave signal developed at the output of the transistor 85 is fixed at a constant level. In particular, the diode 111, which is connected from the line 88 to the cathode of the diode 113, in combination with the capacitor 112 provides a reverse bias to the diode 113. Should the voltage level at the collector 92 exceed the reverse bias of the diode 113, the diode will become forward biased and thereby limit the output of the transistor 85 by conducting through a further resistor 114 to the common circuit line 94. A further diode 115 is connected from a circuit junction point 116 between the resistor 103 and the capacitor 104 to ground at 117 and assures that the error signal as developed at the circuit junction point 106 will not exceed a designated positive value.

Since the D-C level developed at the circuit junction point 106 may vary due to the normal modulation of the frequency signal appearing at the base 84 of the transistor 85, it is desirable to eliminate any detection of such slight and temporary fluctuations in the D-C level. Accordingly, the capacitor 104 and the resistor 103 in combination are chosen to provide a delay in the averaging of the output of the transistor 85 to assure that only long range changes in the frequency of the incoming signal at the base 84 are detected by the detection circuit at the terminal 108.

It will be understood that various modifications and combinations of the features of my invention may be accomplished by those skilled in the art, but I desire to claim all such modifications and combinations as properly come within the spirit and scope of my invention.

I claim:

1. An automatic frequency control system comprising:
input means for receiving the frequency of a frequency source to be controlled,
means for generating a stable frequency standard,
means for mixing the input source frequency and the frequency standard to generate a difference frequency signal,
means to square the difference frequency signal,
means to limit the amplitude of the difference frequency,
means to gate the difference frequency signal into a series of pulses each having a fixed pulse duration,
means for converting the gated pulse difference signal into a D-C signal,
means for generating a D-C reference signal,
means for utilizing the D-C reference signal with the gated difference signal to develop an error signal,
means for applying the error signal to the frequency source to be controlled, and
means to adjust the frequency of the frequency source being controlled in response to the error signal,
said means to gate the difference frequency signal into a series of pulses each having a fixed pulse duration comprises:
means to divide the squared difference frequency signal into first and second signal components,
a circuit junction point,
means to apply the first signal component to the junction point,
means to time delay the second signal component,
means to invert the second signal component,
means to apply the delayed and inverted second signal component to the circuit junction point thereby subtracting from the first signal component, and
means to generate an output signal in response to the voltage magnitude present at the circuit junction point prior to the subtraction of the second signal component from the first signal component,
whereby an output signal is developed having a constant pulse duration wherein the pulse duration is determined by the time delay of the second signal component.

2. An automatic frequency control system in accordance with claim 1 wherein
said first and second signal components are applied to the base terminals of first and second transistors respectively, and wherein the output of each of said transistors has a diode clipping circuit connected thereto thereby fixing the magnitude of the output signal of said transistors to a specified uniform level.

3. An automatic frequency control system in accordance with claim 2 wherein the output of said second transistor is connected to the base of said first transistor and wherein said means to delay the second signal component is interposed between the means to divide the squared difference signal into two components and the base of the second transistor.

4. An automatic frequency control system in accordance with claim 3 wherein a temperature sensitive resistor is connected in the base circuit of the second transistor to compensate for temperature operation effects of said second transistor.

5. In an automatic frequency control system including means for developing a monitor signal having a frequency which is representative of the frequency of the signal being frequency controlled, means for squaring the waveform of the monitor signal, control means for fixing both the amplitude and the pulse duration of the squared monitor signal, means for developing a reference signal, comparison means, means for applying the reference signal and the amplitude and duration fixed monitor signal to the comparison means, means for generating an output signal from the comparison means which reflects the deviation of the frequency of the monitor signal from a given frequency level, said reference signal having a magnitude which is adjusted to establish a given frequency level for said monitor signal about which deviation of said signal generates said output signal, and means for utilizing said output signal to adjust the frequency of the signal being controlled, said control means for fixing both the amplitude and the pulse duration of the squared monitor signal includes:

means for dividing the monitor signal into first and second signal components, means to time delay the second signal component relative to the first signal component, means to invert the polarity of the second signal component, and means to algebraically add the first signal component to the time delayed second signal component thereby limiting the duration of the resulting signal to the time delay of the second signal component over the first signal component.

6. An automatic frequency control system in accordance with claim 5 wherein means to algebraically add the first and second signal components comprises:

first and second transistors, means for applying the first signal component to the base of the first transistor, means for applying the delayed second signal component to the base of the second transistor, and means for applying the polarity inverted output of the second transistor to the base of the first transistor, whereby the output of the second transistor is limited to a duration between the times of application of the first and second signal components to the first transistor.

7. An automatic frequency control system in accordance with claim 6 wherein means for fixing the amplitude of the squared monitor signal comprises:

first and second diodes connected respectively in parallel with the output of said first and second transistors, and signal means tending to reverse bias each of said diodes thereby establishing the clipping level of said diodes.

8. An automatic frequency control system in accordance with claim 6 wherein a temperature variable resistor is connected in parallel with the input terminals of said second transistor thereby to counteract temperature effects on said transistor by varying the forward bias applied to the transistor in accordance with the temperature ambient thereto.

9. In an automatic frequency control system including:

means for developing a monitor signal having a frequency which reflects the frequency of the signal to be frequency controlled, means for separating a portion of the monitor signal, means for precisely time delaying the separated portion of the monitor signal, means for developing opposite polarities between the monitor signal and the separated time delayed portion, means for recombining the monitor signal and the separated time delayed and relatively polarity inverted portion thereof, a control device having an input and an output, means for coupling the recombined monitor signal to the input of the control device, means for sensing the average value of the output of the control device thereby sensing changes in frequency of the input monitor signal, means for coupling a reference signal to the output of the control device, and means for developing an error signal in response to the output of the control device in accordance with the deviation of the average value of the output thereof from a norm as established by said reference signal.

References Cited

UNITED STATES PATENTS

| | | | |
|---|---|---|---|
| 2,580,254 | 12/1951 | Summerhayes, et al. | 331—32 |
| 2,774,872 | 12/1956 | Howson | 331—27 |
| 2,963,648 | 12/1960 | Baskin et al. | 331—8 |
| 3,010,073 | 11/1961 | Melas | 331—8 |
| 3,049,631 | 8/1962 | Taylor | 331—1 |
| 3,249,886 | 5/1966 | Anderson et al. | 331—8 |

JOHN KOMINSKI, Primary Examiner

U.S. Cl. X.R.

331—1, 17, 14, 30, 32